United States Patent
Jellicorse et al.

(10) Patent No.: US 6,267,253 B1
(45) Date of Patent: Jul. 31, 2001

(54) LOGISTICS RACK FOR SPACE FLIGHT

(75) Inventors: John W. Jellicorse, Houston; Frank Thomas Eichstadt, Kemah, both of TX (US)

(73) Assignee: Spacehab, Inc., Washington, DC (US)

(*) Notice: Subject to any disclaimer, the term of this patent is extended or adjusted under 35 U.S.C. 154(b) by 0 days.

(21) Appl. No.: 09/377,627

(22) Filed: Aug. 19, 1999

(51) Int. Cl.$^7$ ..................................................... A47F 5/00
(52) U.S. Cl. .............................. 211/13.1; 211/189; 296/3; 224/401
(58) Field of Search .................................. 211/95, 131.1, 211/10, 189, 191, 13.1; 296/3; 224/401; 244/118.1, 118.2

(56) References Cited

U.S. PATENT DOCUMENTS

| | | | |
|---|---|---|---|
| 1,635,201 | * | 7/1927 | Bell et al. |
| 3,435,959 | * | 4/1969 | Berman et al. ................... 211/95 X |
| 3,807,788 | * | 4/1974 | Radek ........................... 211/131.1 X |
| 5,181,815 | * | 1/1993 | Haberkorn ........................ 211/189 X |
| 5,452,811 | * | 9/1995 | Taravella et al. ................ 211/194 X |
| 5,462,178 | * | 10/1995 | Wallach et al. ...................... 211/95 |
| 5,544,765 | * | 8/1996 | Farbman .............................. 211/189 |
| 5,984,114 | * | 11/1999 | Frankel .......................... 211/131.1 X |
| 6,039,501 | * | 3/2000 | Ruther ............................. 211/189 X |

* cited by examiner

Primary Examiner—Robert W Gibson, Jr.
(74) Attorney, Agent, or Firm—Rossi & Associates

(57) ABSTRACT

A logistics rack has a common core with a top end and a bottom end, an interchangeable upper interface adapter releaseably coupled to the top end, and an interchangeable lower interface adapter releaseably coupled to the bottom end. The upper and lower interface adapters may be readily changed to allow the logistics rack to be utilized on a variety of space vehicles or modules. The common core includes a plurality of stowage bays in which logistics bags are secured.

8 Claims, 5 Drawing Sheets

LOGISTICS RACK FOR SPACE FLIGHT

FIELD OF THE INVENTION

The invention relates in general to a stowage apparatus which secures and stows items such as clothes, food, equipment, and tools in a space flight environment. More specifically, the invention provides a logistics rack including a plurality of stowage bays in which soft-sided logistics bags are secured during flight. The logistics rack is of modular design that allows the rack to be readily reconfigured for use in a variety of space flight applications.

BACKGROUND OF THE INVENTION

Items required for space flight, such as clothes, food, equipment and tools, have previously been stored within special purpose stowage apparatus such as lockers or racks. FIG. 1, for example, illustrates a stowage locker 10 having a number of stowage compartments 12 that is specifically configured for flight aboard a pressurized module located within the cargo bay of an STS Orbiter. The stowage locker 10 includes a fixed structure that defines the stowage compartments 12, such that when the stowage compartments 12 are emptied, the stowage locker 10 still occupies a fixed volume of useless space within the space vehicle. Still further, the structure of the stowage locker 10 with the fixed stowage compartments 12 constitutes a significant amount of dead weight, as solid panels are used in the construction of the stowage locker 10.

In order to overcome the problems associated with the stowage locker 10 illustrated in FIG. 1, another approach to stowing items for space travel incorporates the use of cargo bags that are strapped to a stowage rack. FIG. 2, for example, illustrates a special purpose stowage rack 14 under development on which a number of cargo stowage bags 16 are strapped. The structure of the stowage rack 14 is substantially reduced from that of the stowage locker 10, as fixed stowage compartments are not utilized and the weight of the structure is therefore reduced. Further, once the cargo bags 16 are removed from the stowage rack 14, the space previously occupied by the cargo bags 16 becomes available for use.

Still further, it has been proposed that existing special purpose science racks (not shown) utilized to hold experiment packages within pressurized modules located in the cargo bay of the STS Orbiter be modified to carry the cargo bags 16 illustrated in FIG. 2. The science racks, however, are constructed to fit in a particular module unit and cannot be readily reconfigured for use on different types of vehicles or modules. Accordingly, as with the other types of lockers and racks discussed above, it would be necessary to manufacture different types of racks for different types of applications.

In view of the above, it would be desirable to provide a stowage apparatus that holds a large volume of items, is relatively light weight, and may be readily reconfigured for flight on a variety of space vehicles or modules. Still further, it would be desirable to provide a stowage apparatus that includes the ability to launch in one configuration and be reconfigured on orbit for return in a different configuration.

SUMMARY OF THE INVENTION

The present invention provides a stowage apparatus that holds a large volume of items, is light weight, and may be readily reconfigured for flight on a variety of space vehicles or modules. In addition, the stowage apparatus can be launched in one configuration and then reconfigured in orbit for return in a different configuration.

Specifically, the present invention utilizes a logistics rack of modular design that includes a common core having a top end and a bottom end, an interchangeable upper interface adapter releaseably coupled to the top end of the common core, and an interchangeable lower interface adapter releaseably coupled to the bottom end of the common core. The common core preferably includes a back support structure, a top support structure, a plurality of vertical side support structures connected to the back support structure and the top support structure, and a plurality of horizontal support structures connected to the vertical side support structures, wherein a plurality of stowage bays are defined. The interchangeable lower interface adapter includes a base member that is releaseably coupled to the common core and a lower support structure that couples to a specific vehicle or module. Similarly, the interchangeable upper interface adapter includes an attachment member that is releaseably coupled to the common core and two side support struts that are coupled to a specific vehicle or module. The ability to readily interchange the upper and lower interface adapters allows the logistic rack to be easily configured for use in a variety of applications. In addition, the support structures faces are of open design that reduce weight and allow physical access into the rack.

BRIEF DESCRIPTION OF THE DRAWINGS

The invention will now be described with reference to certain preferred embodiments thereof and the accompanying drawings, wherein.

DETAILED DESCRIPTION OF THE PREFERRED

Figure 3:
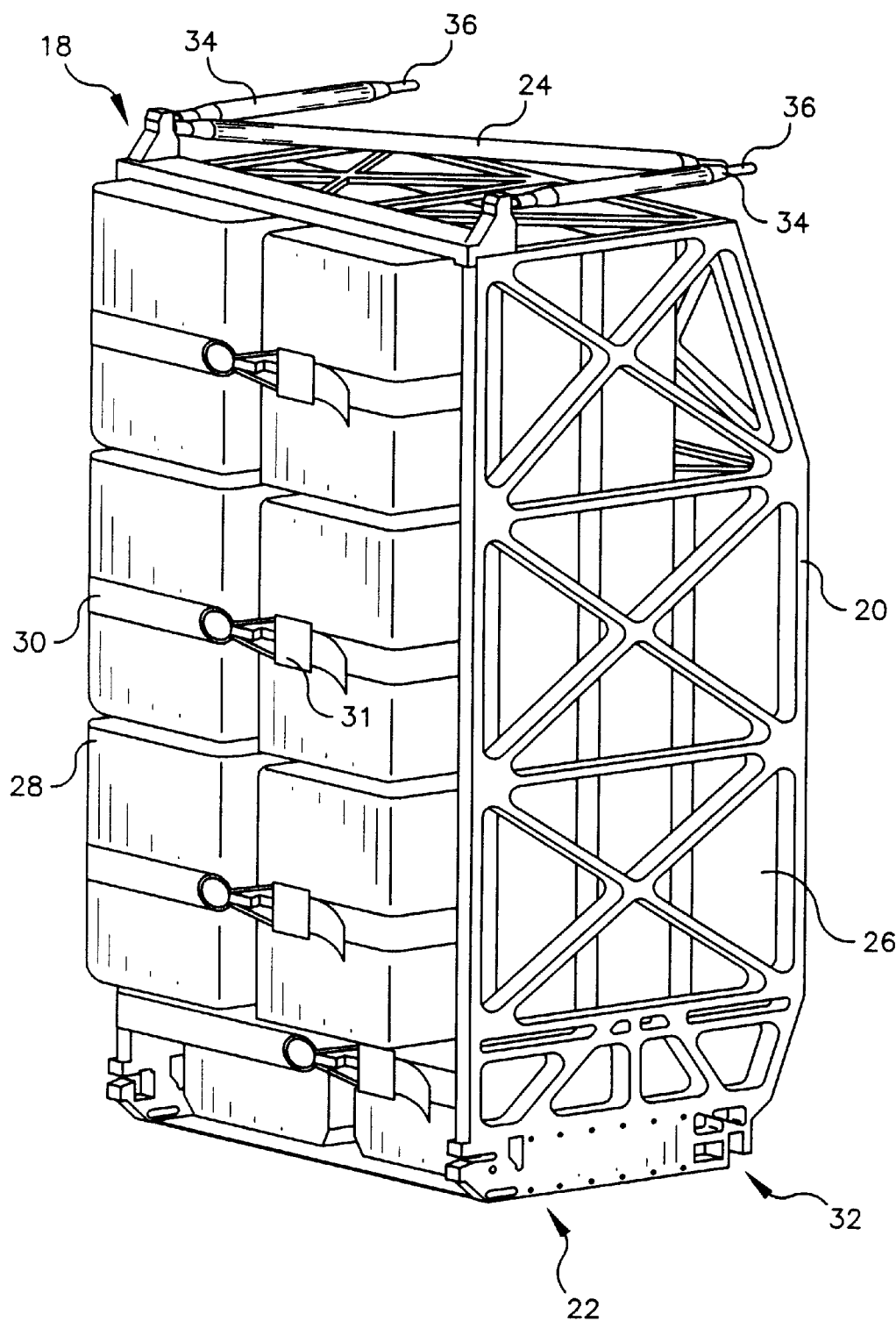
FIG. 3 is a perspective view of a logistics rack in accordance with the invention.

Referring now to FIG. 3, a logistics rack 18 in accordance with the present invention is illustrated as including a common core 20, an interchangeable lower interface adapter 22, and an interchangeable upper interface adapter 24. The common core 20 includes a number of stowage bays 26 into which logistics bags 28 can be inserted and secured. In a preferred embodiment, the logistics bags 28 are secured by straps 30 with locking buckles 31 that are attached to the structure of the common core 20, although any other mechanism that retains the logistics bags 28 with the stowage bays 26 by be readily employed including, as only one example, clip-type fasteners that are secured on the common core 20 and clip onto the logistics bags 28. The interchangeable lower interface adapter 22 is releaseably coupled to the lower end of the common core 20 and includes an interface 32 designed to fit or mate with an interface of a specific space vehicle or module. In the illustrated embodiment of FIG. 3, the interface 32 is designed to fit with the structure of multi-purpose logistics module (MPLM) developed for logistics support of the International Space Station (ISS). Similarly, the interchangeable upper interface adapter 24 includes side support struts 34 incorporating coupling fittings 36, which are designed to connect to the structure of the MPLM or other space vehicles with equivalent MPLM interfaces.

Figure 4:
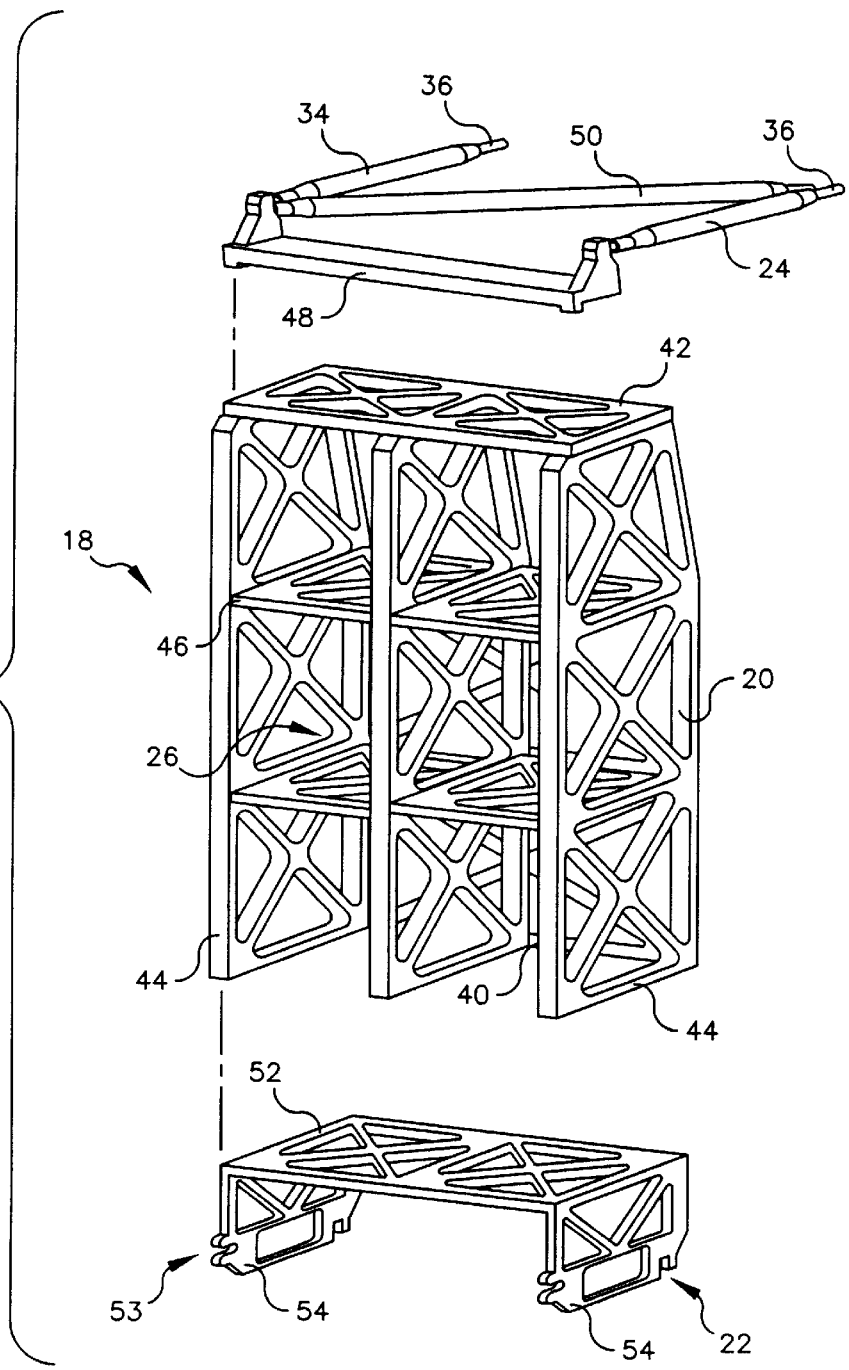
FIG. 4 is an exploded view of a logistics rack configured for use on a multi-purpose logistics module (MPLM)
Figure 5:
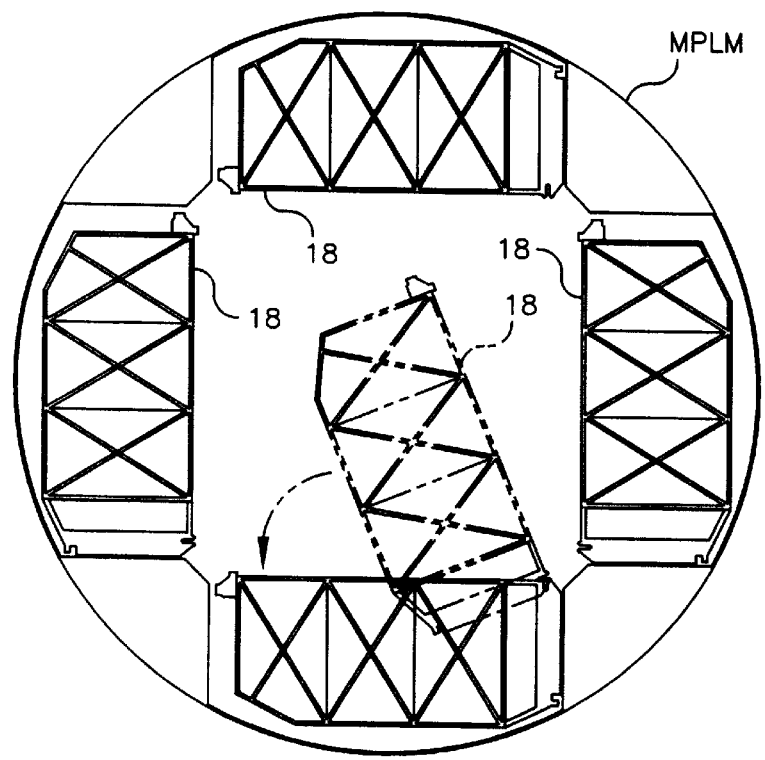
FIG. 5 illustrates the placement of four logistics racks within an MPLM.

FIG. 4 illustrates the components of the logistics rack 18 in greater detail. As illustrated in FIG. 4, the common core 20 is preferably constructed using a back support structure 40, a top support structure 42, vertical side support structures 44 and horizontal support structures 46, each of which are preferably constructed using open cross-bracing or isogrid instead of solid panels to reduce weight. In the illustrated embodiment, three horizontal rows and two vertical rows of stowage bays 26 are provided within the structure of the common core 20, although it will be understood that the number of stowage bays 26 may be readily varied depending on the application. The interchangeable upper interface adapter 24 includes an attachment member 48 that can be releaseably coupled to the common core 20, and two side support struts 34 and a cross-strut 50. The coupling of the attachment member 48 to the common core 20 can be accomplished by any mechanism that allows easy detachment and re-attachment of the components during pre-flight processing, including—but not limited to—bolts, screws and mechanical latches. As discussed above, the two side supports struts 34 are provided with the coupling fittings 36 that mate with the MPLM. The interchangeable lower interface adapter 22 includes a base support 52 that can be releaseably coupled to the common core 20, and a lower support structure 53 that includes two side supports 54 having the interface 32 that mates with the MPLM. In the illustrated embodiment, the space provided between the two side supports 54 of the lower support structure 53 is also utilized as a stowage bay. FIG. 5 illustrates the placement of four logistics racks 18 within an MPLM, and the ability of the logistics racks 18 to tilt out for contingent rear access, even when fully loaded with storage bags.

Figure 1:
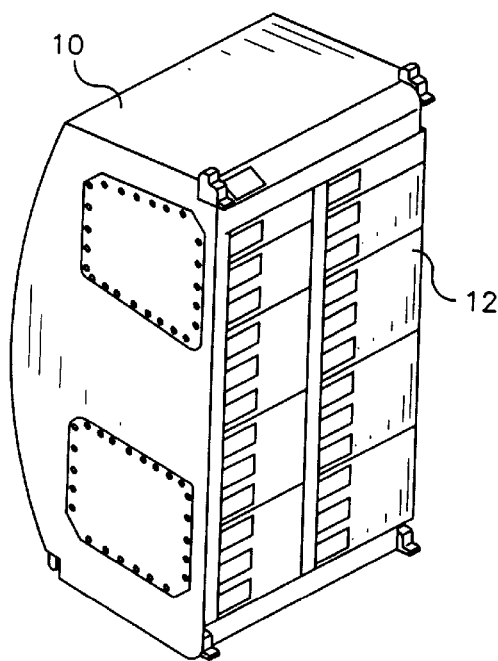
FIG. 1 is a perspective view of a prior art stowage unit.
Figure 2:
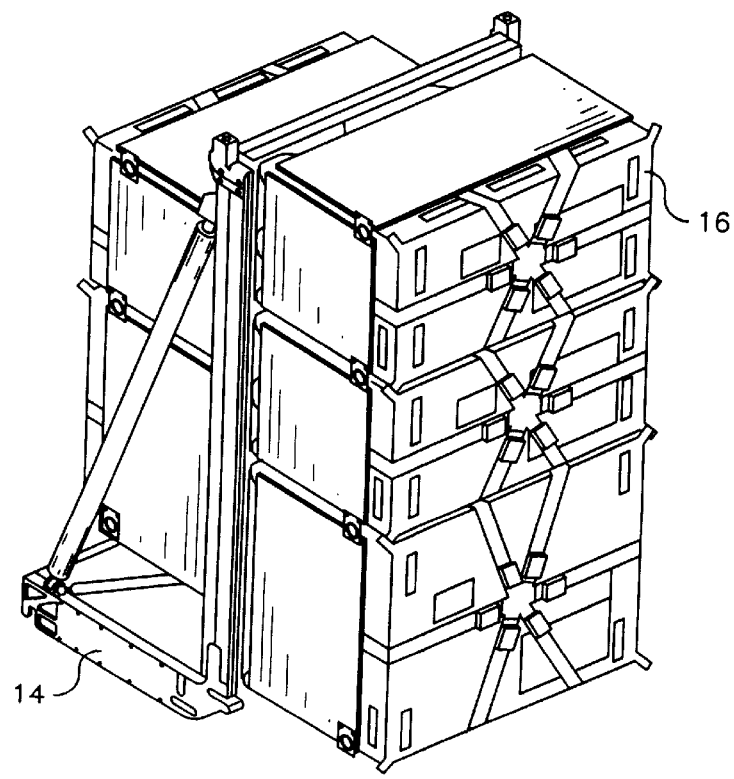
FIG. 2 is a perspective view of a developmental stowage rack.
Figure 7:
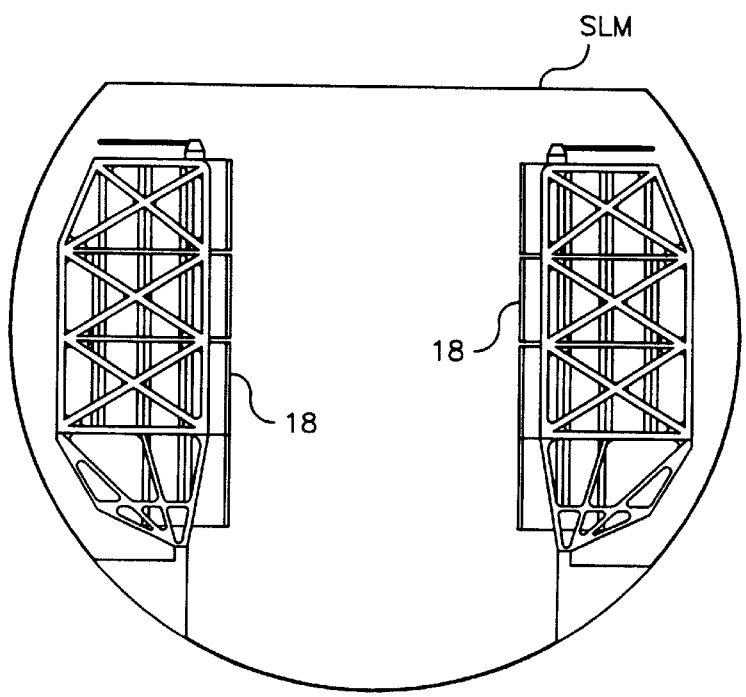
FIG. 7 illustrates the placement of two logistics racks within an SLM.
Figure 6:
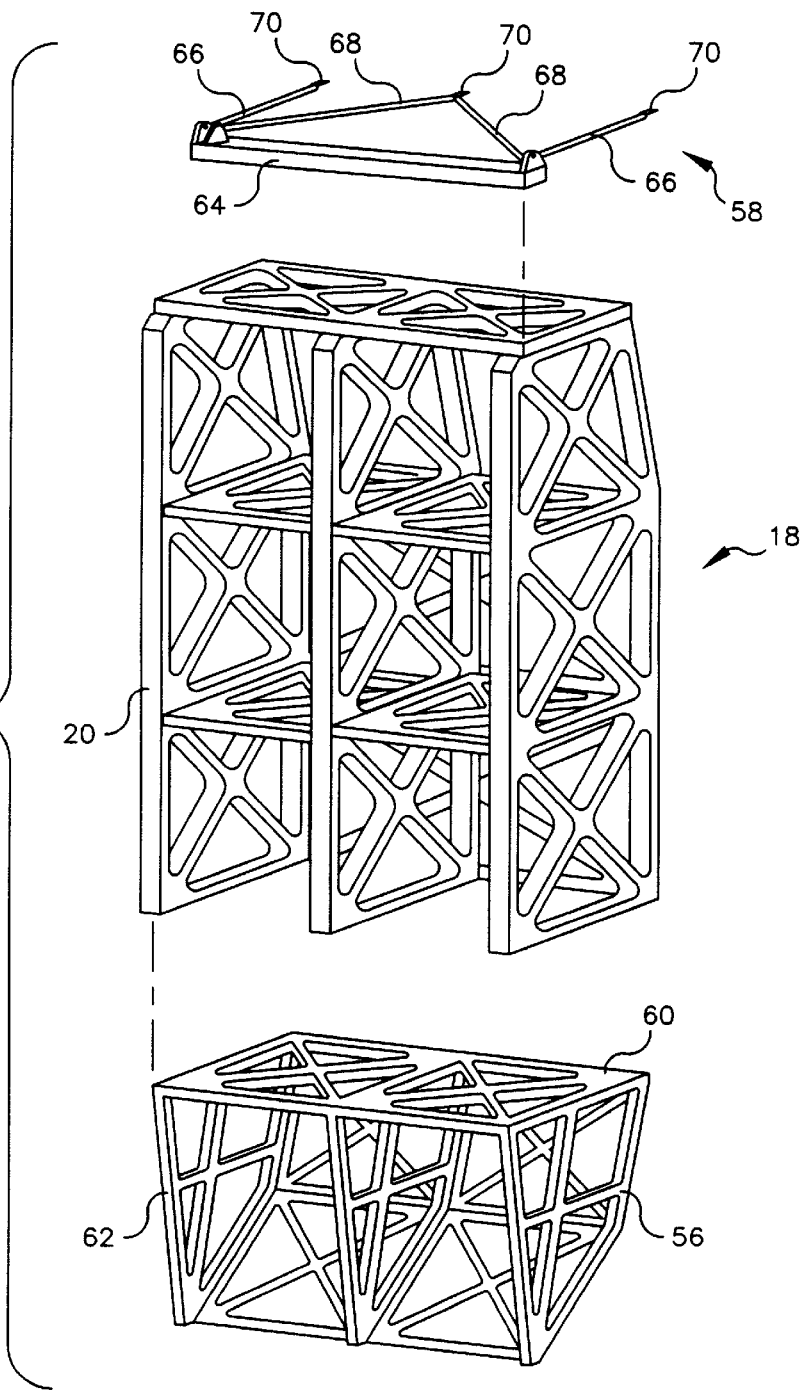
FIG. 6 is an exploded view of a logistics rack configured for use on a Spacehab Logistics Module (SLM)

The interchangeability of the upper and lower interface adapters 22, 24 allows the logistics rack 18 to be readily reconfigured for use on a different type of vehicle or module. For example, as illustrated in FIG. 6, the interchangeable lower and upper interface adapters 22, 24 of FIG. 2 that were configured to mate with the MPLM, are readily replaced by interchangeable lower and upper interface adapters 56, 58 that are configured to mate with the structures of Spacehab Logistic Modules (SLMs), manufactured and operated by Spacehab, Inc., which are utilized in the cargo bay of the STS Orbiter. In this configuration, the interchangeable lower interface adapter 56 includes a base support 60 that is releaseably coupled to the common core 20 and a lower support structure 62 that mates with the structure of the SLM. The interchangeable upper interface adapter 58 includes an attachment member 64 that can be releaseably coupled to the common core 20, two side support struts 66 and two center support struts 68 arranged in a V-shape configuration between the two side support struts. The two side supports struts 66 and the ends of the center support struts 68 at the point of the V include coupling fittings 70 that mate with the SLM. FIG. 7 illustrates the placement of two logistic racks 18 within an SLM.

The present invention provides a logistics rack 18 that is used to manifest logistics bags to orbit. A unique feature of the logistics rack versus other stowage devices is that the stowage rack can be configured for use in a variety of space vehicles and modules. In the SLM configuration illustrated in FIG. 6, the logistics rack 18 is capable of holding up to twenty six single mid-deck locker volume equivalent (MLVE) size bags, and up to a total payload capability of 1150 lbs. In the MPLM configuration illustrated in FIG. 4, the logistics rack 18 is capable of holding up to 24 MLVE size bags and up to a total payload capability of approximately 1550 lbs.

The invention has been described with reference to certain preferred embodiments thereof. It will be understood, however, that modification and variations are possible within the scope of the appended claims.

What is claimed is:

1. A logistics rack comprising:

a common core having a top end and a bottom end, wherein the common core includes a back support structure, a top support structure, a plurality of vertical side support structures connected to the back support structure and the top support structure, and a plurality of horizontal support structures connected to the vertical side support structures, and wherein the back support structure, the top support structure, the vertical side support structures and the horizontal support structures define a plurality of stowage bays;

an interchangeable upper interface adapter releaseably coupled to the top end of the common core; and an interchangeable lower interface adapter releaseably coupled to the bottom end of the common core.

2. A logistics rack comprising:

a common core having a top end, and a bottom end wherein the common core includes a back support structure, a top support structure, a plurality of vertical side support structures connected to the back support structure and the top support structure, and a plurality of horizontal support structures connected to the vertical side support structures, and wherein the back support structure, the top support structure, the vertical side support structures and the horizontal support structures define a plurality of stowage bays;

an interchangeable upper interface adapter releaseably coupled to the top end of the common core; and an interchangeable lower interface adapter releaseably coupled to the bottom end of the common core; and retaining means for retaining logistics bags within the stowage bays;

wherein the retaining means comprises straps with locking buckles.

3. A logistics rack comprising:

a common core having a top end and a bottom end;

an interchangeable upper interface adapter releaseably coupled to the top end of the common core; and an interchangeable lower interface adapter releaseably coupled to the bottom end of the common core;

wherein the interchangeable lower interface adapter includes a base member and a lower support structure.

4. The logistics rack claimed in claim 1, wherein the interchangeable lower interface adapter includes a base member and a lower support structure.

5. The logistics rack claimed in claim 1, wherein the interchangeable upper interface adapter includes an attachment member and support struts.

6. The logistics rack claimed in claim 3, wherein the common core includes a plurality of stowage bays.

7. The logistics rack claimed in claim 6, further comprising retaining means for retaining logistics bags within the stowage bays.

8. The logistics rack claimed in claim 1, further comprising retaining means for retaining logistics bags within the stowage bays.

* * * * *